(12) United States Patent
Hamilton

(10) Patent No.: US 7,866,762 B1
(45) Date of Patent: Jan. 11, 2011

(54) TRANSMISSION BRAKE DISENGAGEMENT APPARATUS AND METHOD OF OPERATION

(76) Inventor: William H. Hamilton, 9799 Wayne Ave., Cincinnati, OH (US) 45215

( * ) Notice: Subject to any disclaimer, the term of this patent is extended or adjusted under 35 U.S.C. 154(b) by 893 days.

(21) Appl. No.: 11/319,140

(22) Filed: Dec. 27, 2005

(51) Int. Cl.
B60T 13/00 (2006.01)
B60T 15/18 (2006.01)

(52) U.S. Cl. .................. 303/20; 303/89; 307/141; 307/141.4

(58) Field of Classification Search .......... 303/20, 303/28, 89, 191; 307/10.1, 141.4, 141, 141.1; 361/195; 188/265
See application file for complete search history.

(56) References Cited

U.S. PATENT DOCUMENTS

| 4,467,219 | A | | 8/1984 | Reid | |
|---|---|---|---|---|---|
| 4,596,215 | A | | 6/1986 | Palesotti | |
| 4,812,671 | A | | 3/1989 | Furrow | |
| 4,840,157 | A | | 6/1989 | Furrow | |
| 4,846,467 | A | * | 7/1989 | Rosson | 273/445 |
| 4,873,891 | A | | 10/1989 | Guanciale | |
| 5,600,185 | A | * | 2/1997 | Hamma et al. | 307/10.1 |
| 5,675,191 | A | | 10/1997 | Hamilton et al. | |
| 6,050,384 | A | * | 4/2000 | Hammond | 192/221 |
| 6,678,214 | B1 | * | 1/2004 | McMahon | 368/6 |
| 7,066,075 | B1 | * | 6/2006 | Callis, Jr. | 91/461 |

FOREIGN PATENT DOCUMENTS

JP 7269692 A * 10/1995

* cited by examiner

Primary Examiner—Melody M Burch
(74) Attorney, Agent, or Firm—Mark F. Smith; Smith Brandenburg Ltd

(57) ABSTRACT

The present invention is directed to a transmission brake disengagement apparatus which eliminates the disadvantages of transmission brake disengagement apparatus having mechanical switches thereby improving the starting consistency of a drag race car. In particular, the present invention provides an improved transmission brake disengagement apparatus which incorporates a mechanical actuation switch for providing an electrical signal to effect the disengagement of an electrically actuated transmission brake of a drag race car, without the need of applying continuous pressure on the switch.

13 Claims, 2 Drawing Sheets

TRANSMISSION BRAKE DISENGAGEMENT APPARATUS AND METHOD OF OPERATION

BACKGROUND

The present invention relates to a transmission brake disengagement apparatus for mounting on a drag race car and more particularly, to a method of activating and deactivating a transmission brake of a drag race car and a transmission brake disengagement apparatus having a mechanical actuation switch for providing an electrical signal to effect the disengagement of an electrically actuated transmission brake of a drag race car.

In the sport of drag racing, drivers strive to cover a fixed distance in a preselected time and the difference between winning and losing a race is often measured in thousandth's of a second. Accordingly, the nature of a drag race places importance on the consistency of operation of the mechanisms of the car and the consistency of the reaction time of the driver with the result that getting off to a good start being a matter of great importance to race car drivers.

In one form of drag racing, cars may cross the starting line only after the green light or starting light comes on. If the car crosses the starting line prior to the green light, the driver is said to have "red lighted" and automatically loses. Conventional drag race cars are equipped with a transmission brake which comprises a solenoid which when energized holds the car at the starting line thereby allowing the driver to power-up the engine of the car prior to the start of the race and to maintain the engine at or near maximum power until the solenoid is de-energized.

Typically, the start of a drag race is first initiated by a series of yellow lights which are illuminated in sequence with each light being illuminated for five-tenths of a second before the green light appears. Thus, the driver of a drag race car is in a position to judge the time the green light will illuminate and react by releasing a mechanical starting switch which the driver has been holding down by use of continuous hand pressure to electronically disengage the transmission brake. Upon disengagement of the transmission brake, the car will accelerate down the track.

In order to improve starting consistency a delay box having a timing circuit was developed that operated to disengage the transmission brake of the car and eliminate the need to estimate the time the green light will illuminate. The circuit included a programmable down counter and a clock which begins a timing sequence when a starting switch is released. Thus, the driver could release pressure on the starting switch when the first of a series of yellow lights illuminate and the transmission brake would be disengaged when the counter reached a zero count. Since the driver could allow for his reaction time in setting the counter, the introduction of this circuit theoretically placed him in a position to attain an ideal start.

Unfortunately, a driver's reaction time between races is not consistent. Further, the position of the diver's hand, the hand strength of the driver, the temperature and the amount of use of the mechanical starting switch can all effect the activation time of the starting switch and the consistency of the timing of the start. Further, the driver may overestimate or underestimate his reaction time thereby resulting in his car starting prior to or after the green light is illuminated.

Accordingly, a need exist for a transmission brake disengagement apparatus for improving the consistency of activating the timing circuit of a delay box for disengaging the transmission brake of a drag race car which is not adversely effected by the position or strength of the driver's hand or the temperature and the amount of use of the apparatus.

SUMMARY OF THE INVENTION

The present invention is directed to a transmission brake disengagement apparatus which eliminates the disadvantages of transmission brake disengagement apparatus having mechanical switches thereby improving the starting consistency of a drag race car. In particular, the present invention provides an improved transmission brake disengagement apparatus which incorporates a mechanical actuation switch for providing an electrical signal to effect the disengagement of an electrically actuated transmission brake of a drag race car, without the need of applying continuous pressure on the switch.

In a preferred embodiment of the invention, the transmission brake disengagement apparatus includes a starter having at least one push and release mechanical switch. In a preferred embodiment of the invention the starter comprises a single mechanical switch such that when pushed and released for the first time prior to the start of a race the transmission brake disengagement apparatus operates to send an electrical signal to the transmission brake solenoid that functions to hold the drag race car in place. The multiple push and release mechanical switch when pushed and released for the second time prior to the start the transmission brake disengagement apparatus operates to send an electrical signal to activate a count down timer having an adjustable counter.

In another preferred embodiment of the invention, the multi push and release mechanical switch when pushed and released for the third time prior to the start of the race the transmission brake disengagement apparatus operates to send an electrical signal to an electronic "bump" timer to allow the driver to increase or decrease the time before the transmission brake disengages.

In another preferred embodiment of the invention, the transmission brake disengagement apparatus includes an electronic solenoid timer to deactivate the transmission brake in the event the transmission brake has been activated for more than a certain period of time.

In another preferred embodiment of the invention, the transmission brake disengagement apparatus includes an electronic reset timer for resetting the adjustable counter of the count down timer.

Another preferred embodiment of the invention is a method of activating and deactivating the transmission brake of a drag race car comprising the steps of operating a starter to activate a solenoid of a transmission brake; and activating an electronic count down timer with an adjustable counter for deactivating the transmission brake after a fixed amount of time; wherein the starter comprises a mechanical switch that is actuated without the need of applying continuous pressure on the switch.

In another preferred embodiment of the invention, the switch to activate the transmission brake and to activate the countdown time is a multi push and release switch.

In another preferred embodiment of the invention, the method includes the step of adjusting the counter of the electronic count down timer.

In another preferred embodiment of the invention, the switch to increase or decrease the countdown time and the switch to activate the transmission time and to activate the countdown time is the same switch.

In another preferred embodiment of the invention, the method includes deactivating the transmission brake after the transmission brake has been activated for a fixed period of time.

It is therefore desirable to provide a transmission brake disengagement apparatus which improves the starting consistency of a drag race car.

It would also be desirable to provide a transmission brake disengagement apparatus which eliminates the disadvantages of mechanical starting switches that require continuous hand pressure.

It would also be desirable to provide a transmission brake disengagement apparatus which is not affected with the drivers hand position or physical strength.

It would also be desirable to provide a transmission brake disengagement apparatus which prevents or reduces the likelihood of damage of the transmission brake solenoid resulting from sustained activation.

It would also be desirable to provide a transmission brake disengagement apparatus that allows the driver to increase or decrease the countdown time of disengagement of the transmission brake.

It would also be desirable to provide a transmission brake disengagement apparatus which reacts consistently upon activation by the drag race car driver.

It would also be desirable to provide a transmission brake disengagement apparatus which reduces the risk that the transmission brake may be damages due to extended periods of activation.

These and other advantages and embodiments of the invention will be apparent from the following description, the accompanying drawings and the appended claims.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
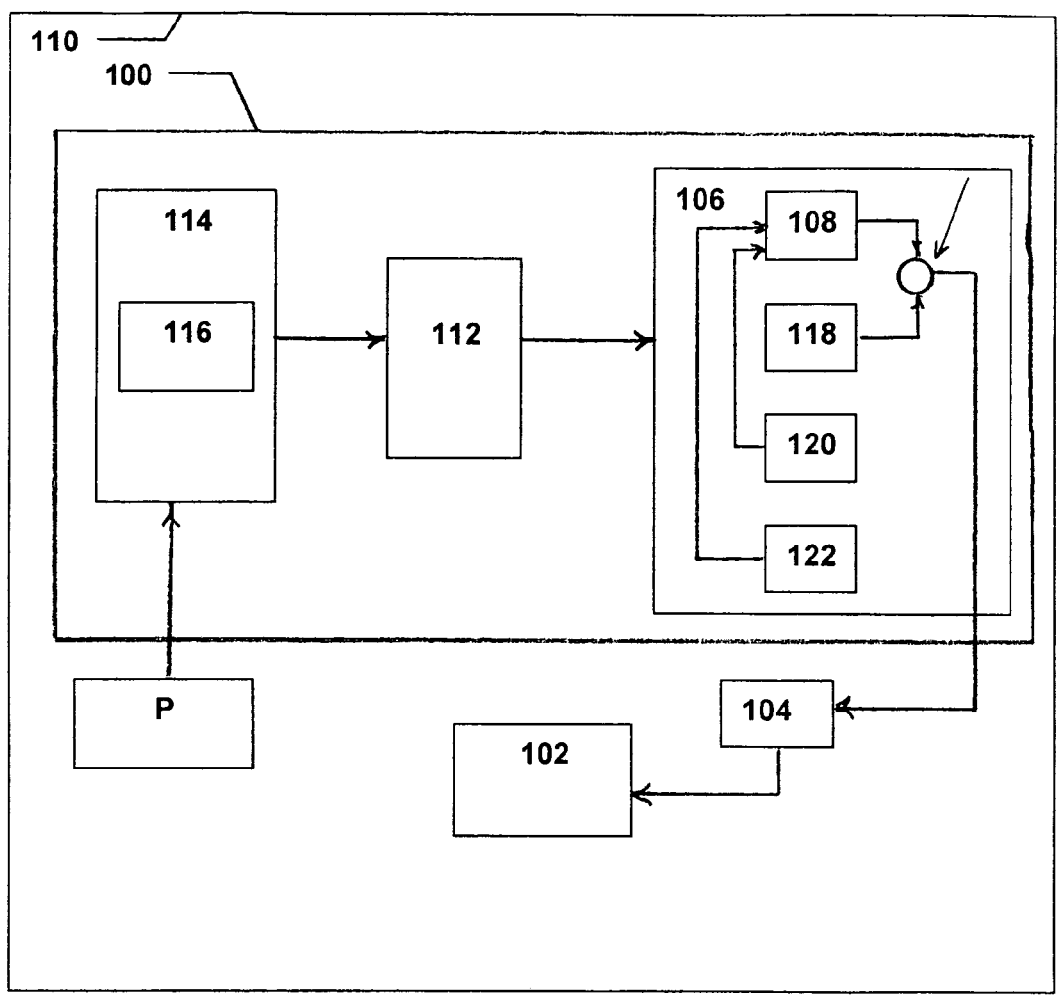
FIG. 1 is a schematic diagram illustrating the transmission brake disengagement apparatus of the present application.
Figure 2:
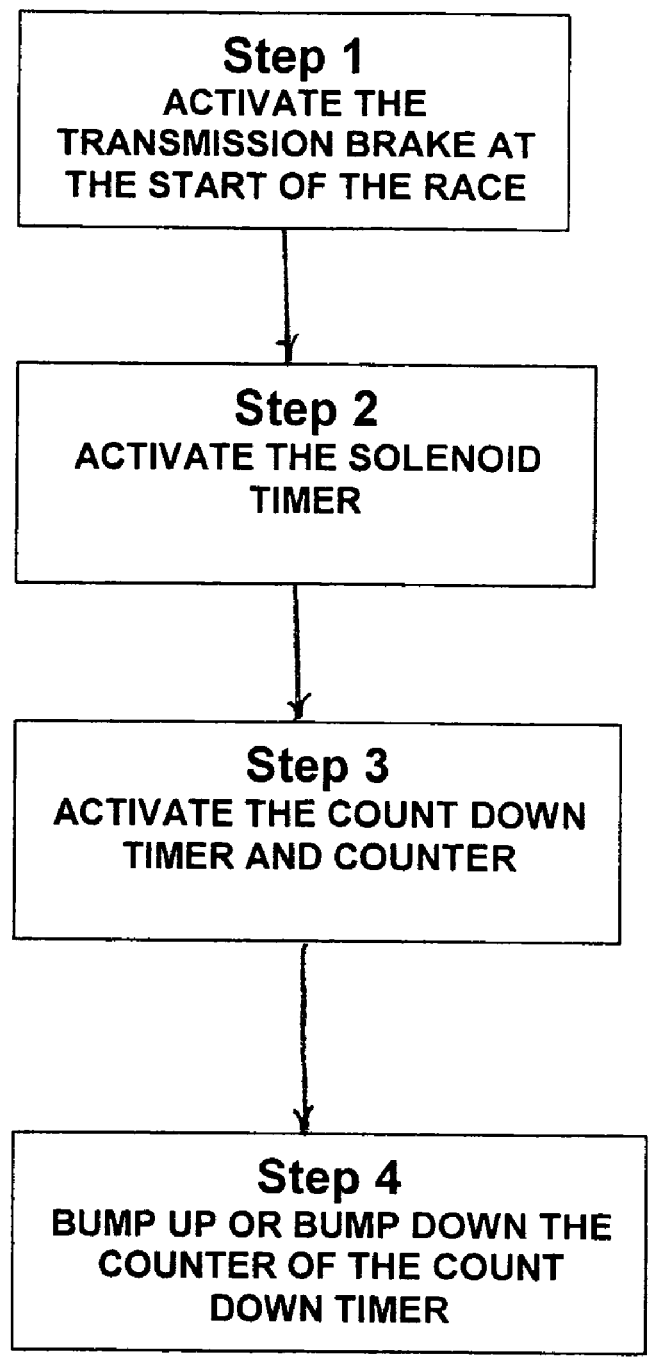
FIG. 2 is a is a flowchart illustrating the methodology of a method of making patterns of the subject application.

Referring now to the drawings in general, shown therein and designated by the reference number 100 is a schematic diagram of the driver activated transmission brake disengagement apparatus constructed in accordance with the present invention. A conventional electrically actuated transmission brake, represented by the box bearing reference numeral 102, includes a solenoid 104 and will permit the transmission of the drag race car to be engaged at such times that an electrical current flows through the solenoid 104 and will disengage the transmission brake at such times that no current flows through the solenoid 104. The transmission brake disengagement apparatus 100 includes a delay box, represented by the box bearing reference numeral 106, containing an electronic count down timer with an adjustable counter 108 for providing precisely controlled time intervals, is conventionally mounted in a convenient location in the drag race car 110. The transmission brake disengagement apparatus 100 further includes a microprocessor 112 that defines, determines, and coordinates the total system into a constant, safe, and a and is electrically connected to and cooperates with a starter 114 having at least one electronic starting switch 116. In operation, a power source P is electronically connected to the microprocessor 112 through the starter 114 and provides electrical power to the microprocessor 112 and to activate the proper systems within the delay box 106. Each starting switch 116 of the starter 114 is a conventional push and release mechanical switch conventionally mounted on the steering wheel, or other convenient location, of the drag race car 110 to facilitate use of the starter 114 by the driver.

With this general description of the transmission brake disengagement apparatus 100 of the subject application, it will be useful to begin the detailed description of the methodology of the transmission brake disengagement system. Referring to the Figures, after the drag race car 110 is moved to the starting line just prior to the start of a race, the driver begins by activating the transmission brake 102 by pushing down and releasing a starting switch 116 of starter 114 (step 1). Pressing down and releasing the starting switch 116 at this point operates to transmit a voltage signal to the microprocessor 112 which operates to signal the delay box 106 to send power to the transmission brake solenoid 104 (as indicated by the arrow) thereby electronically actuating the transmission brake 102 and hold the race car 112 in position. Simultaneously with the activation of the transmission brake solenoid 104, the microprocessor 112 activates an electronic solenoid timer 118 that after a fixed period of time will disrupt the voltage single signal from the delay box 106 to the transmission brake solenoid 104 and electronically deactivate the transmission brake 102 (step 2). Disruption of the voltage single to the transmission brake solenoid 104 ensures that the solenoid 104 will not stay activated for a substantial period of time, generally more than a minute, thereby preventing over heating and possible damage to the solenoid 104. When the driver first observes the first of a series of yellow starting lights, which are illuminated for five-tenths of a second before the green light appears, the driver again uses the starter 114 and presses down and releases a starting switch 116 which cooperates with the microprocessor 112 to send a voltage single signal to the delay box 106 to electronically activate the electronic count down timer with an adjustable counter 108 (step 3). In order to improve starting consistency, the electronic count down timer 108 operates to electronically disrupt the voltage single signal being sent to the transmission brake solenoid 104 thereby disengaging the transmission brake 102 of the car 110 when the counter of the count down timer 108 reaches a zero count. The use of the count down timer 108 eliminates the need for the driver to estimate the time the green light will illuminate. Since the driver could allow for his reaction time in setting the counter of the electronic count down timer 108, the introduction of this electronic timer 108 theoretically places him in a position to attain an ideal start.

In another preferred embodiment of the invention, the delay box 106 also includes an electronic reset timer 120. The electronic reset timer 120 is electronically connected to the count down timer 108. If the driver fails to verify the start of the race, such as by pressing and releasing the starting switch 116 within a fixed amount of time, the microprocessor 112 will transmit an electronic signal to the reset timer 120 of the delay box 106 which operates to reset the counter of the count down timer 108. The use of the electronic reset timer 120 allows the driver to cancel the original start time in the event that the start of the race is postponed.

In another preferred embodiment of the invention the transmission brake disengagement apparatus 100 includes an adjustable electronic "bump" timer 122. The driver, prior to the start of the race, can input into the timer 122 a "bump up"

or a "bump down" time to the timing circuit of the timer 122. The "bump" timer 122 is electrically connected to count down timer 108. Upon receiving an electronic single from the microprocessor 112 which was initiated by the driver by use if the starter 114, such as by pressing and releasing a starting switch 116 (step 4), the counter of the count down timer 108 is increased or decreased by the predetermined "bump up" or "bump down" time thus increasing or decreasing the amount of time before the transmission brake 102 of the car 110 disengages. It should now be understood that if the driver believes that he was slightly off on pressing and releasing the starting switch 116 at step 3, the driver has an opportunity to have the transmission brake 102 released at the desired starting time.

Accordingly, the subject invention is a safe and consistent transmission brake disengagement assembly which eliminates the disadvantages of transmission brake disengagement assemblies having conventional hold down mechanical switches, is not affected with the drivers hand position or physical strength, which consistently and relatively instantaneously reacts upon activation by the drag race car driver, and which reduces the risk of inadvertent activation of the transmission brake timing circuit. Further, it should also be apparent to one skilled in the art that the use of a second electronic timer allows the driver to reject his first timing light and "bump up" or "bump down" the timed start.

Although this invention has been shown and described with respect to detailed embodiments thereof, it will be understood by those skilled in the art that various changes in form and detail thereof may be made without departing from the spirit and scope of the claimed invention.

I claim:

1. A transmission brake disengagement apparatus for use in a drag race car having an electric power source and an electrically actuated transmission brake, said transmission brake disengagement apparatus comprising a starter having at least one count down timer and at least one electronic mechanical push and release starting switch electrically connected to the transmission brake and said electric power source such that power is provided to said transmission brake to hold the drag race car in place when said at least one electronic mechanical push and release starting switch is first pushed and then released without activating any said count down timer, and said at least one starting switch operates to activate said at least one count down timer when said starting switch is again pushed and released.

2. The transmission brake disengagement apparatus of claim 1, wherein said at least one count down timer is an adjustable counter for providing precisely controlled time intervals.

3. The transmission brake disengagement apparatus of claim 2 further comprising a reset timer for resetting said adjustable counter.

4. A transmission brake disengagement apparatus for activating and deactivating a transmission brake of a drag race car comprising a delay box containing an at least one electronic count down timer having an adjustable counter; a microprocessor; and a starter having at least one electronic starting switch; wherein each said at least one electronic starting switch is a mechanical push and release switch such that when first pushed and released operates to activate the transmission brake to hold the drag race car in place without activating any said at least one electronic count down timer and when pushed and released a second time operates to activate said at least one electronic count down timer.

5. The transmission brake disengagement apparatus of claim 4 further comprises an electronic solenoid timer for deactivating the transmission brake, wherein said electronic solenoid timer operates to deactivate the transmission brake if said at least one electronic count down timer is not activated within a fixed amount of time.

6. The transmission brake disengagement apparatus of claim 4 further comprising a reset timer for increasing or decreasing the counter of said at least one electronic count down timer.

7. The transmission brake disengagement apparatus of claim 4 wherein pressing and releasing said starting switch operates to activate an electronic solenoid timer to deactivate the transmission brake after a fixed period of time.

8. A driver activated transmission brake disengagement apparatus for sending an electrical signal for activating and deactivating the solenoid of a transmission brake, the transmission brake disengagement apparatus comprising:
   a delay box containing at least one electronic count down timer having an adjustable counter for providing precisely controlled time intervals and an electronic solenoid timer;
   a microprocessor; electrically connected to said delay box; and
   a starter having at least one push and release starting switch electrically connected to said microprocessor;
   wherein when said starter is operated by the driver by pushing and releasing said at least one push and release starting switch a first time, said starter cooperates with said microprocessor to send an electrical signal to said delay box for activating the transmission brake without activating any said said at least one electronic count down timer and when said at least one push and release starting switch is pushed and released a second time said starter cooperates with said microprocessor to send an electrical signal to activate said at least one electronic count down timer;
   wherein when said transmission brake is activated said solenoid timer is activated and operates to disengage said transmission brake if said at least one electronic count down timer and counter is not activated within a predetermined period of time.

9. The transmission brake disengagement apparatus of claim 8 further comprising a reset timer for increasing or decreasing the adjustable counter of said at least one electronic count down timer.

10. The transmission brake disengagement apparatus of claim 8 further comprising a reset timer for resetting the adjustable counter of said at least one electronic count down timer down timer.

11. A method for activating and deactivating the transmission brake of a drag race car comprising the steps of:
    mechanically pressing and releasing a starter switch a first time to provide an electronic signal to activate a solenoid of the transmission brake to engage the transmission brake without activating any count down timer; and
    mechanically pressing and releasing the starter switch a second time to activate an electronic count down timer to deactivate the transmission brake after a fixed amount of time.

12. The method of claim 11 further comprising the step of adjusting a counter of the electronic count down timer.

13. The method of claim 11 further comprising the step of deactivating the solenoid of the transmission brake if the electronic count down timer is not activated within a fixed period of time.

* * * * *